United States Patent
Yoshida et al.

(10) Patent No.: US 7,914,748 B2
(45) Date of Patent: Mar. 29, 2011

(54) EXHAUST PURIFICATION APPARATUS OF INTERNAL COMBUSTION ENGINE

(75) Inventors: Kohei Yoshida, Gotenba (JP); Shinya Hirota, Susono (JP); Takamitsu Asanuma, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 628 days.

(21) Appl. No.: 11/988,865

(22) PCT Filed: Jul. 21, 2006

(86) PCT No.: PCT/JP2006/314939
§ 371 (c)(1),
(2), (4) Date: Jan. 16, 2008

(87) PCT Pub. No.: WO2007/011069
PCT Pub. Date: Jan. 25, 2007

(65) Prior Publication Data
US 2009/0142239 A1    Jun. 4, 2009

(30) Foreign Application Priority Data
Jul. 21, 2005   (JP) .................................. 2005-211056

(51) Int. Cl.
*B01D 50/00*   (2006.01)
(52) U.S. Cl. ...................................................... 422/177
(58) Field of Classification Search .................. 422/177, 422/180; 60/274, 276, 277, 285, 295, 297
See application file for complete search history.

(56) References Cited

U.S. PATENT DOCUMENTS

| 4,378,336 | A | * | 3/1983 | Yoon ............................. 422/201 |
| 5,316,738 | A | * | 5/1994 | Kojima et al. ................. 422/180 |
| 5,874,057 | A |   | 2/1999 | Deeba et al. |
| 6,428,755 | B1 | * | 8/2002 | Rao et al. ....................... 422/180 |
| 6,502,391 | B1 |   | 1/2003 | Hirota et al. |
| 7,097,817 | B2 | * | 8/2006 | Brisley et al. ............... 423/245.3 |
| 7,181,904 | B2 | * | 2/2007 | Yoshida et al. .................. 60/285 |
| 2002/0039966 | A1 |  | 4/2002 | Tanaka et al. |
| 2002/0048542 | A1 |  | 4/2002 | Deeba et al. |
| 2009/0142239 | A1 |  | 6/2009 | Yoshida et al. |

FOREIGN PATENT DOCUMENTS

| CN | 1334899 A | 2/2002 |
| CN | 101223340 A | 7/2008 |
| EP | 1 108 865 A2 | 6/2001 |
| GB | 2 342 056 A | 4/2000 |
| JP | A-11-508821 | 8/1999 |
| JP | A-2001-173432 | 6/2001 |
| JP | A-2001-293366 | 10/2001 |

(Continued)

OTHER PUBLICATIONS

Sep. 15, 2010 European Search Report cited in Application No. EP 06 78 1849.

*Primary Examiner* — Tom Duong
(74) *Attorney, Agent, or Firm* — Oliff & Berridge, PLC

(57) ABSTRACT

An exhaust purification apparatus of an internal combustion engine purifying exhaust gas by removing SOx from the exhaust gas is provided. In the exhaust purification apparatus provided with sulfur oxide trapping material for trapping sulfur oxides exhausted from an internal combustion engine, aggregates of the sulfur oxide trapping material (41) are arranged able to contact the exhaust gas in spaces (44) separated by partitions comprised of a porous material (42) having permeability.

18 Claims, 8 Drawing Sheets

FOREIGN PATENT DOCUMENTS

| | | |
|---|---|---|
| JP | A-2002-172329 | 6/2002 |
| JP | A-2002-309923 | 10/2002 |
| JP | A-2002-540916 | 12/2002 |
| JP | A-2003-239720 | 8/2003 |
| JP | A-2004-330116 | 11/2004 |
| JP | A-2005-133610 | 5/2005 |
| WO | WO 97/02886 A1 | 1/1997 |
| WO | WO 97/43034 A1 | 11/1997 |
| WO | WO 00/59611 A1 | 10/2000 |
| WO | WO 2005/040571 A1 | 5/2005 |

* cited by examiner

US 7,914,748 B2

EXHAUST PURIFICATION APPARATUS OF INTERNAL COMBUSTION ENGINE

CROSS-REFERENCE TO RELATED APPLICATIONS

The patent application is a National Stage filing under 35 U.S.C. §371 of International Application No. PCT/JP2006/314939, filed Jul. 21, 2006, which claims foreign priority to Japanese Patent Application No. 2005-211056, filed Jul. 21, 2005, the disclosures of which are incorporated by reference in their entireties.

TECHNICAL FIELD

The present invention relates to an exhaust purification apparatus of an internal combustion engine.

BACKGROUND ART

In the field of internal combustion engines, there is a demand for preventing the outflow of nitrogen oxides (NOx) contained in exhaust gas exhausted from a combustion chamber into the atmosphere. In order to meet this demand, there is known an exhaust purification catalyst purifying exhaust gas of NOx. Such an exhaust purification catalyst is described in Japanese Patent Publication (A) No. 2001-173432. The exhaust purification catalyst described in Japanese Patent Publication (A) No. 2001-173432 is configured by a plurality of passages separated by partitions; into which passages pellet-shaped NOx absorbent is packed to purify the exhaust gas of NOx by reduction.

DISCLOSURE OF THE INVENTION

In this regard, exhaust gas sometimes contains sulfur oxides (SOx). There is also a demand for preventing the SOx from flowing out into the atmosphere. Therefore, an object of the present invention is to provide an exhaust purification apparatus of an internal combustion engine purifying exhaust gas by removing SOx from the exhaust gas.

To solve this problem, in a first aspect of the present invention, there is provided an exhaust purification apparatus provided with a sulfur oxide trapping material for trapping sulfur oxides exhausted from an internal combustion engine, wherein aggregates of the sulfur oxide trapping material are arranged in a manner able to contact exhaust gas in spaces separated by partitions comprised of a porous material with permeability.

In a second aspect of the present invention, the aggregates of the sulfur oxide trapping material are arranged on said partitions.

In a third aspect of the present invention, the aggregates of the sulfur oxide trapping material are packed in said spaces.

To solve the above problem, in a fourth aspect of the present invention, there is provided an exhaust purification apparatus provided with a sulfur oxide trapping material for trapping sulfur oxides exhausted from an internal combustion engine, wherein the apparatus is provided with a base material having a plurality of passages defined by partitions comprised of a porous material and aggregates of the sulfur oxide trapping material are arranged in specific passages among the passages of said base material.

In a fifth aspect of the present invention, the aggregates of the sulfur oxide trapping material are arranged on partitions defining said specific passages.

In a sixth aspect of the present invention, the aggregates of the sulfur oxide trapping material are packed in said specific passages so as to at least partially block said specific passages.

In a seventh aspect of the present invention, the aggregates of the sulfur oxide trapping material are packed in the entire volumes of said specific passages.

In an eighth aspect of the present invention, at one passage of any two adjoining specific passages, the aggregate of the sulfur oxide trapping material is arranged at one end region of the passage and, at the other passage, the aggregate of the sulfur oxide trapping material is arranged at the other end region of the other passage.

In a ninth aspect of the present invention, at one passage of any two adjoining specific passages, the aggregate of the sulfur oxide trapping material is packed at one end region of said passage so that the end region is blocked and at the other passage, said aggregate of the sulfur oxide trapping material is packed at the other end region of the other passage so that the other end region is blocked.

In a 10th aspect of the present invention, the aggregates of the sulfur oxide trapping material are arranged at both end regions of said specific passages.

In an 11th aspect of the present invention, the aggregates of the sulfur oxide trapping material are packed at both end regions of said specific passages so as to block said end regions.

In a 12th aspect of the present invention, porous aggregates of the sulfur oxide trapping material are arranged between the sulfur oxide trapping materials at the two end regions of the specific passages.

In a 13th aspect of the present invention, the porous aggregates of the sulfur oxide trapping material are arranged so as to occupy the entire volumes of the spaces between the sulfur oxide trapping materials at the two end regions of the specific passages.

In a 14th aspect of the present invention, a plurality of aggregates of the sulfur oxide trapping material are arranged, with spaces between them, between the sulfur oxide trapping materials at the two end regions of the specific passages.

In a 15th aspect of the present invention, aggregates of the sulfur oxide trapping material are arranged at downstream side end regions of passages other than said specific passages as well.

In a 16th aspect of the present invention, aggregates of the sulfur oxide trapping material are packed at downstream side end regions of passages other than said specific passages so as to block said end regions.

In a 17th aspect of the present invention, treatment is performed to raise the temperature of the sulfur oxides in the state maintaining the air-fuel ratio of the exhaust gas flowing into the sulfur oxides in lean, in accordance with at least one of a ratio of sulfur oxides trapped by the sulfur oxide trapping material and an amount of exhaust gas flowing into the sulfur oxide trapping material.

The present invention will be understood more sufficiently from the attached drawings and the description of the preferred embodiments of the present invention.

BRIEF DESCRIPTION OF THE DRAWINGS

FIG. 2a is a front view of an S trap of a first embodiment of the present invention, while

FIG. 3a is a front view of an S trap of a second embodiment of the present invention, while

FIG. 4a is a front view of an S trap of a third embodiment of the present invention, while

FIG. 5a is a front view of an S trap of a fourth embodiment of the present invention, while

BEST MODE FOR CARRYING OUT THE INVENTION

Figure 1:
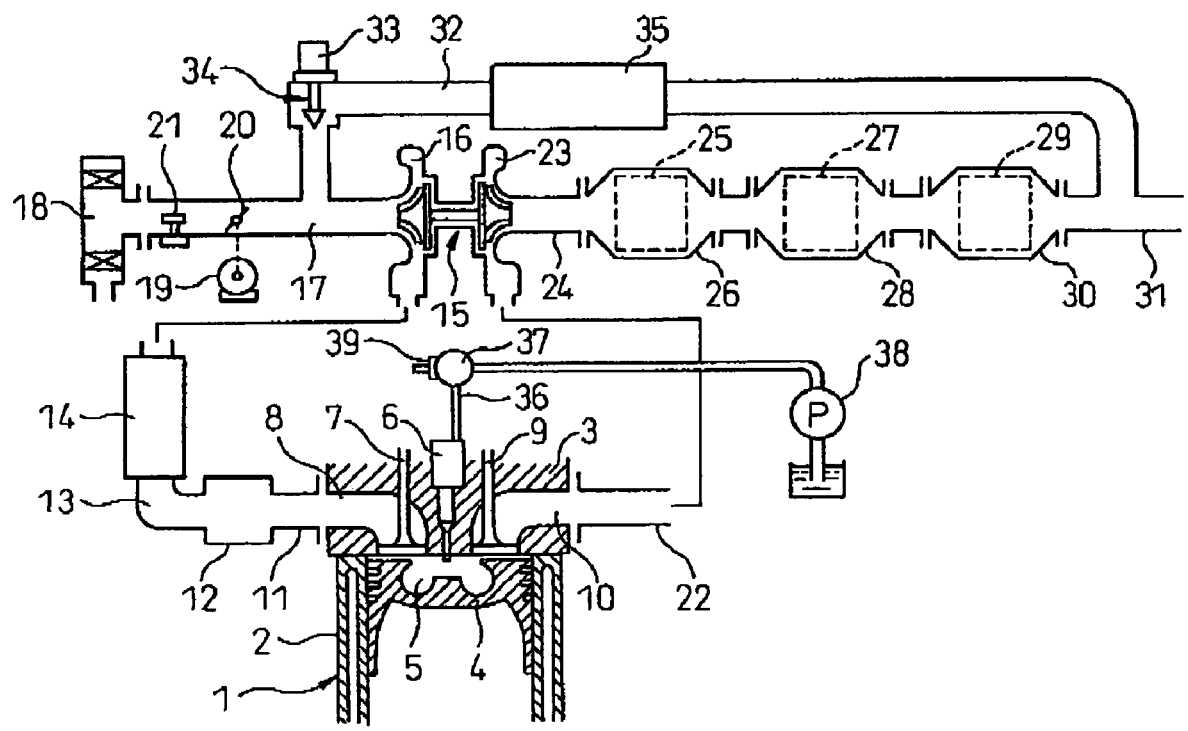
FIG. 1 is an overview of an internal combustion engine provided with an exhaust purification apparatus of the present invention.

The embodiments of the present invention will be explained with reference to the drawings. FIG. 1 is an overview of an internal combustion engine provided with an exhaust purification apparatus of the present invention. The internal combustion engine shown in FIG. 1 is a 4-stroke compression ignition type internal combustion engine (so-called "diesel engine"), but the present invention can also be applied to another internal combustion engine, for example, a 4-stroke spark ignition type internal combustion engine (so-called "gasoline engine").

In FIG. 1, 1 indicates an engine body, 2 indicates a cylinder block, 3 indicates a cylinder head, 4 indicates a piston, 5 indicates a combustion chamber, 6 indicates an electrical control type fuel injector, 7 indicates an intake valve, 8 indicates an intake port, 9 indicates an exhaust valve, and 10 indicates an exhaust port. The intake port 8 is connected through a corresponding intake tube 11 to a surge tank 12. The surge tank 12 is connected through an intake duct 13 and intercooler 14 to an outlet of a compressor 16 of a supercharger, for example, an exhaust turbocharger 15. An inlet of the compressor 16 is connected through an intake pipe 17 to an air cleaner 18. Inside the intake pipe 17, a throttle valve 20 driven by a step motor 19 is arranged. Further, in the intake pipe 17 upstream of the throttle valve 20, a mass flow detector 21 for detecting a mass flow of air taken into the combustion chamber 5 is arranged.

On the other hand, the exhaust port 10 is connected through an exhaust manifold 22 to an inlet of an exhaust turbine 23 of the exhaust turbocharger 15. An outlet of the exhaust turbine 23 is connected through an exhaust pipe 24 to a casing 26 housing an S trap 25. The S trap 25 will be explained in detail later. Further, the casing 26 is connected to a casing 28 housing a particulate filter 27. The particulate filter 27 is for trapping particulate matter of exhaust gas exhausted from the combustion chamber 5. Further, the casing 28 is connected to a casing 30 housing a NOx catalyst 29. The NOx catalyst 29 holds the nitrogen oxides (NOx) in the exhaust gas by absorption or adsorption when the air-fuel ratio of the exhaust gas flowing into it is lean and releases the held NOx and purifies the NOx by reduction by a reducing agent in the exhaust gas (for example, hydrocarbons or carbon monoxide) when the air-fuel ratio of the exhaust gas flowing into it is the stoichiometric air-fuel ratio or rich.

An exhaust pipe 31 connected to an outlet of the casing 30 and the intake pipe 17 downstream of the throttle valve 20 are connected to each other through an exhaust gas recirculation (below, referred to as a "EGR") passage 32. Inside the EGR passage 32 is arranged an EGR control valve 34 driven by a step motor 33. Further, in the EGR passage 32 is arranged an intercooler 35 for cooling the EGR gas flowing through there. In the embodiment shown in FIG. 1, the engine cooling water is led into an intercooler 35 where engine cooling water cools the EGR gas.

On the other hand, the fuel injector 6 is connected through a fuel feed tube 36 to a fuel reservoir, that is, a so-called common rail 37. The common rail 37 is supplied with fuel from an electrical control type variable discharge fuel pump 38. The fuel supplied inside the common rail 37 is supplied through each fuel feed tube 36 to the corresponding fuel injector 6. The common rail 37 has a fuel pressure sensor 39 attached to it for detecting the fuel pressure inside it.

Figure 2A:
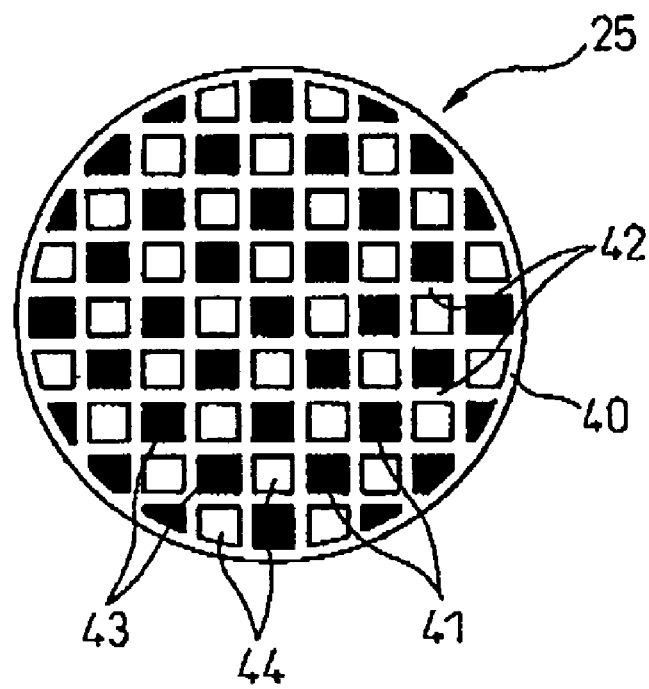
Figure 2B:
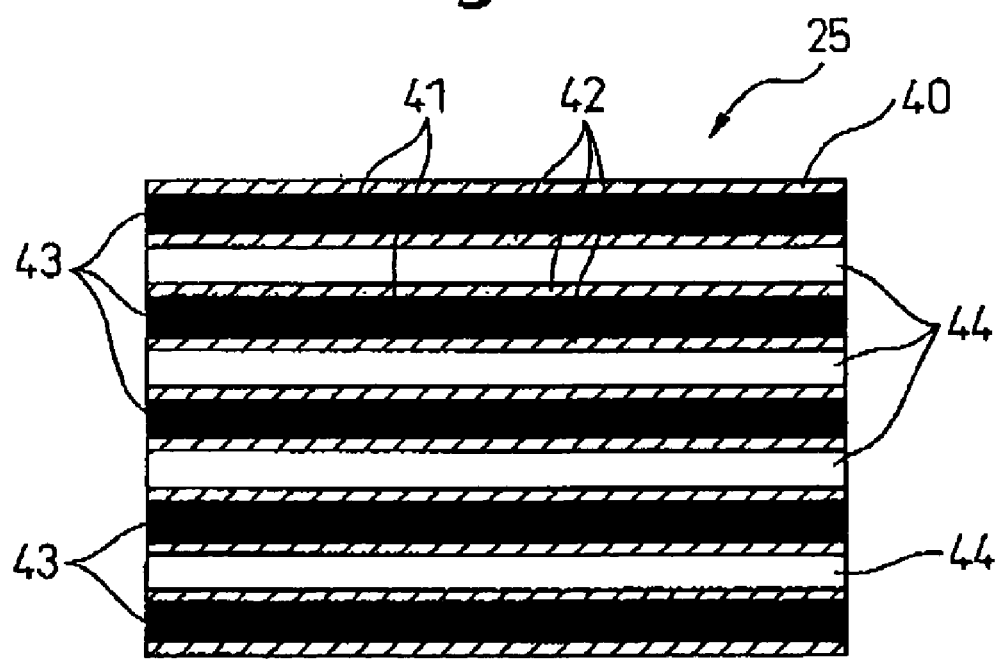
FIG. 2b is a longitudinal cross-sectional view of the same.

Next, the S trap of the first embodiment will be explained with reference to FIGS. 2a and b. Here, FIG. 2a is a front view of an S trap of a first embodiment, while FIG. 2b is a longitudinal cross-sectional view of the same. The S trap 25 of the present embodiment has a honeycomb-shaped base material 40 fabricated from cordierite or another porous material and a sulfur oxide trapping material (below, referred to as a "S trapping material") 41 for trapping the sulfur oxides (SOx) in the exhaust gas. Further, inside the base material 40, partitions comprised of a porous material 42 define a plurality of passages (below, referred to as "cells") 43, 44. These cells 43, 44 extend in parallel with each other. On the other hand, the S trapping material 41 includes at least one element selected from potassium (K), sodium (Na), cesium (Cs), and other such alkali metals, barium (Ba), calcium (Ca), and other such alkali earth metals, and lanthanum (La), yttrium (Y), and other such rare earths, and platinum or another precious metal catalyst carried diffused on at least the surface. It exhibits a strong basicity and traps SOx in the form of sulfuric acid ions $SO_4^{2-}$ or sulfates.

Further, the S trapping material 41 is arranged at several specific cells 43 among the cells 43 and 44 of the base material 40 (below, referred to as the "specific cells") in a manner packing them so as to occupy the entire volumes of said specific cells 43. Here, in the example shown in FIGS. 2a and b, the specific cells are selected so that there are four specific cells 43 surrounding each other cell 44. That is, seen in FIG. 2a, every other cell 43 in the longitudinal direction and lateral direction is selected as a specific cell.

The S trap 25 is arranged in the casing 26 so that, for example, in FIG. 2b, the exhaust gas flows in from the end at the left side and the exhaust gas flows out from the end at the right side. For this reason, the exhaust gas reaching the S trap 25 basically flows into the cells 44 in which the S trapping material is not arranged and flows out through the insides of the cells 44 from the S trap. Here, the cells 43 in which the S trapping material 41 is arranged and the cells 44 in which it is not are separated by the partitions comprised of a porous material 42, so the SOx in the exhaust gas flowing into the cells 44 in which the S trapping material is not arranged can pass through the pores of the partitions 42 and reach the S trapping material 41. That is, the S trapping material 41 is arranged in a manner able to contact the exhaust gas inside the cells 44 separated by the partitions comprised of a porous material having permeability. Further, the SOx reaching the S trapping material 41 in this way is trapped by the S trapping material.

As in the first embodiment, if arranging the S trapping material 41 in the cells 43 in a form packed so as to occupy the entire volumes of the cells 43, the following effects are obtained. That is, in the past, an S trapping material was arranged in the cells in a manner coating the partition surfaces, but in this case, even if making the thickness of the S trapping material coated on the partition surfaces greater, that is, even if increasing the amount of S trapping material coated on the partition surfaces, if the amount ended up exceeding a certain amount, it had been believed that the amount of SOx which the S trapping material could trap would not increase. This is because the S trapping material only traps SOx at the surfaces or the parts close to the surfaces, so to increase the amount of SOx which the S trapping material can trap, it has been believed that it is necessary to not increase the amount of S trapping material coated on the partitions, but to enlarge the surface area of the S trapping material coated.

However, research by the inventors of this application found that while SOx is trapped at the surfaces of the S trapping material, the SOx trapped at the surfaces of the S trapping material gradually diffuses inside the S trapping material and is held in the S trapping material. That is, in the same way as in the past, when arranging the S trapping material in the cells in a form coated on the partition surfaces, if making the thickness of the S trapping material coated on the partition surfaces greater, that is, if increasing the amount of S trapping material coated on the partition surfaces, even if the surface area of the S trapping material is the same, it is learned that the amount of SOx which the S trapping material can trap increases.

In the above-mentioned embodiment of the present invention, the S trapping material is arranged as aggregates inside the cells in a form packed so as to occupy the entire volumes of the insides of the cells, so the amount of S trapping material used in the S trap as a whole becomes greater than the amount used in the past. At the very least, if viewed from the viewpoint of the thickness of the S trapping material arranged (coated) at the partition surfaces where the S trapping material should be arranged (coated), the thickness of the S trapping material of the present embodiment is much greater than the thickness of the past where it had been thought that even if made greater than this, the amount of SOx which the S trapping material can trap would not become greater. Further, if viewed from the viewpoint of the amount of S trapping material arranged (coated) per unit surface area of the partition surfaces where the S trapping material should be arranged (coated), the amount of S trapping material of the present embodiment is much greater than the amount of the past where it had been thought that even if made greater than this, the amount of SOx which the S trapping material can trap would not become greater. For this reason, according to the present embodiment, the amount of SOx which can be trapped by the S trap as a whole becomes much greater compared with the past.

Figure 3A:
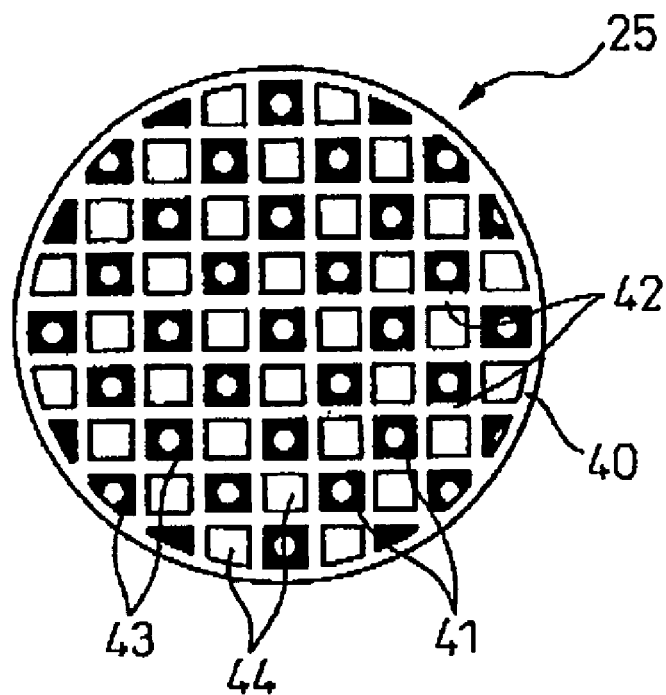
Figure 3B:
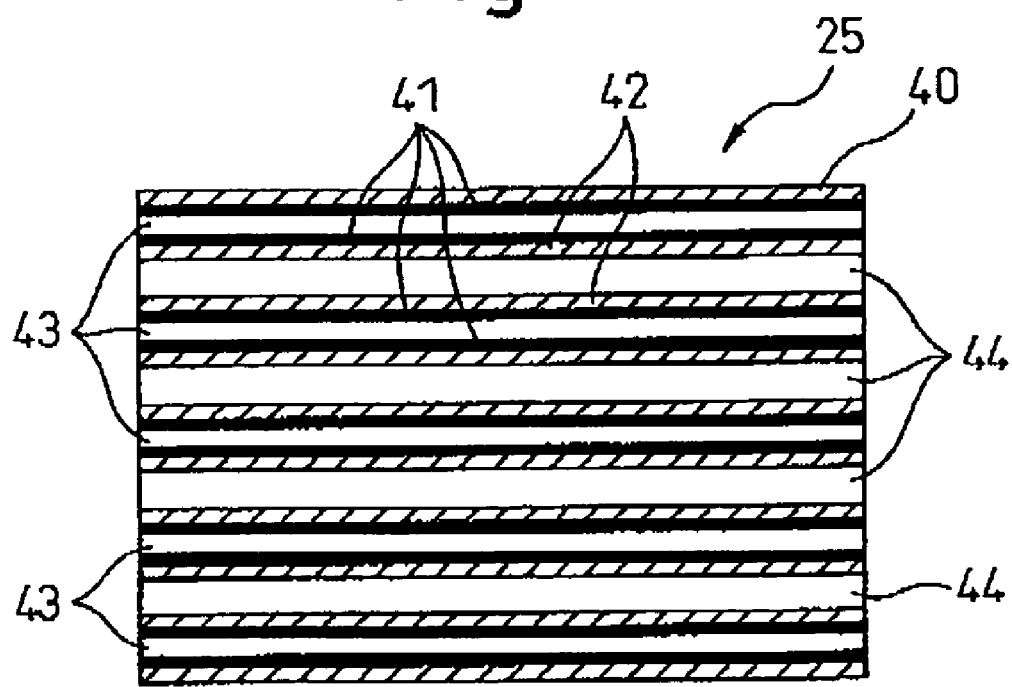
FIG. 3b is a longitudinal cross-sectional view of the same.

Next, a second embodiment will be explained. An S trap of the second embodiment is shown in FIGS. 3*a* and *b*. Here, FIG. 3*a* is a front view of an S trap of a second embodiment, while FIG. 3*b* is a longitudinal cross-sectional view of the same. The base material 40 of the S trap 25 of the present embodiment is the same as that of the first embodiment. Further, in the present embodiment as well, the S trapping material 41 is arranged inside the cells 43 defined as "specific cells" in the first embodiment, but in the present embodiment, unlike the first embodiment, the S trapping material 41 is arranged inside the cells in a manner packed in the cells so as to leave spaces extending along the long axes of the cells 43 at the middle of the cells. That is, in the present embodiment, the S trapping material 41 is arranged in the cells in a manner packed so as to partially close the cells 43.

According to the second embodiment, the SOx in the exhaust gas flowing into the cells 44 where the S trapping material is not packed passes through the pores of the partitions 42 and reaches the S trapping material 41 where it is trapped in the S trapping material. The SOx in the exhaust gas flowing into the spaces extending along the centers of the S trapping material also is trapped by the S trapping material 41 while flowing through said spaces.

In the second embodiment as well, the S trapping material 41 is arranged as aggregates inside the cells 43, so the amount of S trapping material used in the S trap as a whole becomes greater than the amount used in the past. At the very least, if viewed from the viewpoint of the thickness of the S trapping material arranged (coated) at the partition surfaces where the S trapping material should be arranged (coated), the thickness of the S trapping material of the present embodiment is much greater than the thickness of the past, where it had been thought that even if made greater than this, the amount of SOx which the S trapping material can trap would not become greater. Further, if viewed from the viewpoint of the amount of S trapping material arranged (coated) per unit surface area of the partition surfaces where the S trapping material should be arranged (coated), the amount of S trapping material of the present embodiment is much greater than the amount of the past where it had been thought that even if made greater than this, the amount of SOx which the S trapping material can trap would not become greater. For this reason, according to the present embodiment, for the same reason as explained above, the amount of SOx which can be trapped by the S trap as a whole is much greater than the past.

Figure 4A:
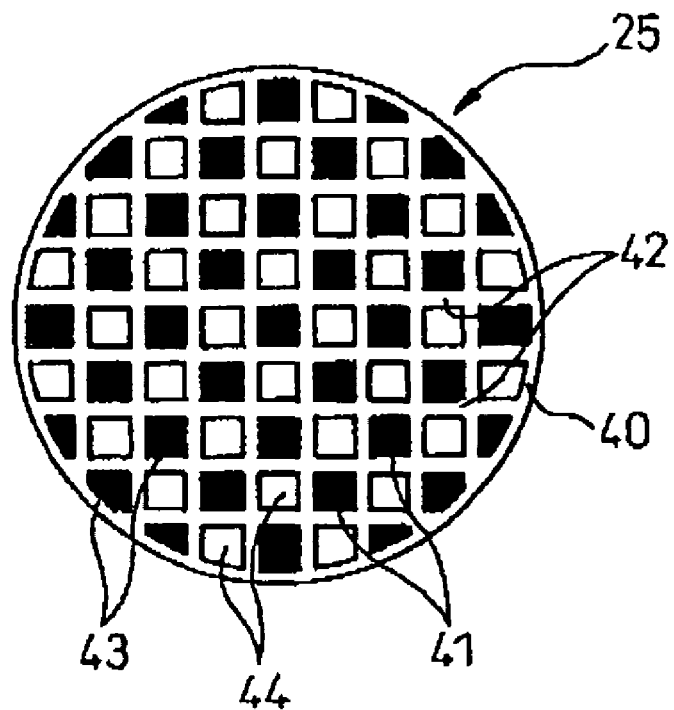
Figure 4B:
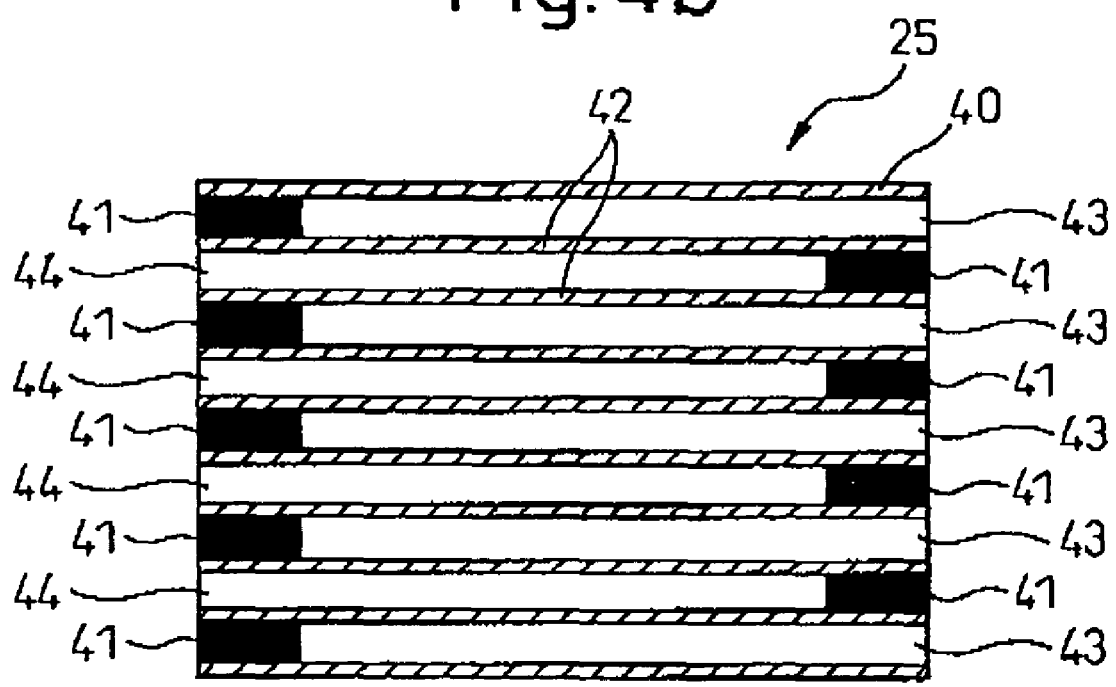
FIG. 4b is a longitudinal cross-sectional view of the same.

Next, a third embodiment will be explained. The S trap of the third embodiment is shown in FIGS. 4*a* and *b*. Here, FIG. 4*a* is a front view of an S trap of the third embodiment, while FIG. 4*b* is a longitudinal cross-sectional view of the same. The base material 40 of the S trap 25 of the present embodiment is the same as that of the first embodiment. Further, in the present embodiment, in the cells 43 defined as the "specific cells" in the first embodiment, the S trapping material 41 is arranged only at one end regions (the regions of the left ends seen in FIG. 4*b*) in a manner packing said end regions to completely block them, while in the remaining cells 44, the S trapping material 41 is arranged only at the other end regions (the regions of the right ends seen in FIG. 4*b*) in a manner packing said end regions to completely block them.

In the third embodiment, the exhaust gas flows into the cells 44 where the S trapping material 41 is arranged at the downstream side (the right side in FIG. 4*b* when exhaust gas arrives from the left side in FIG. 4*b*) end regions, passes through the pores of the partitions around the cells 44, flows into the cells 43 where the S trapping material 41 is arranged at the upstream side (the left side in FIG. 4*b* when exhaust gas arrives from the left side in FIG. 4*b*) end regions, and flows out from the downstream side openings of said cells 43. Further, the SOx in the exhaust gas reaching the S trapping material 41 is trapped by the S trapping material while the exhaust gas flows in this way.

In the third embodiment as well, the S trapping materials are arranged as aggregates inside the cells, so the amount of S trapping material used in the S trap as a whole is greater than the amount used in the past. At the very least, if viewed from the viewpoint of the thickness of the S trapping material arranged (coated) at the partition surfaces where the S trapping material should be arranged (coated), the thickness of the S trapping material of the present embodiment is much greater than the thickness of the past, where it had been thought that even if made greater than this, the amount of SOx which the S trapping material can trap would not become greater. Further, if viewed from the viewpoint of the amount of S trapping material arranged (coated) per unit surface area of the partition surfaces where the S trapping material should be arranged (coated), the amount of S trapping material of the present embodiment is much greater than the amount of the past where it had been thought that even if made greater than this, the amount of SOx which the S trapping material can trap would not become greater. For this reason, according to this embodiment, for the same reason as explained above, the amount of SOx which can be trapped by the S trap as a whole is much greater than the past.

Figure 5A:
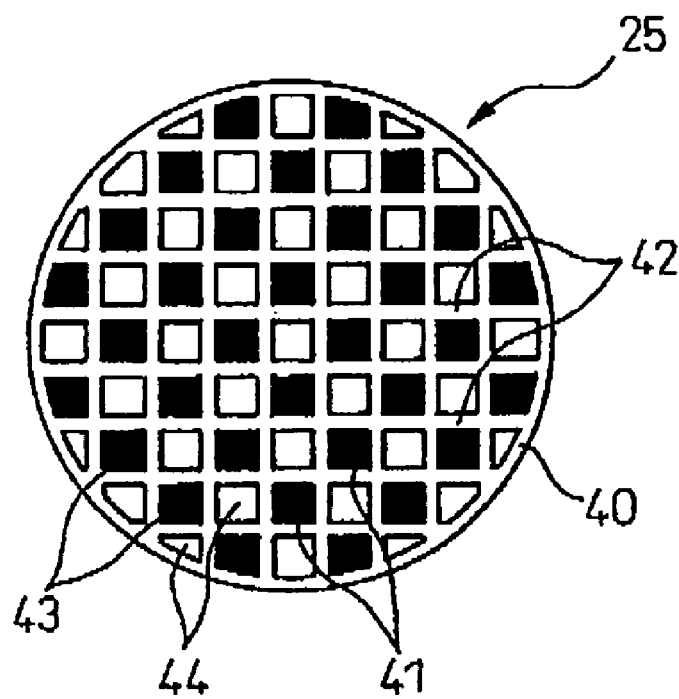
Figure 5B:
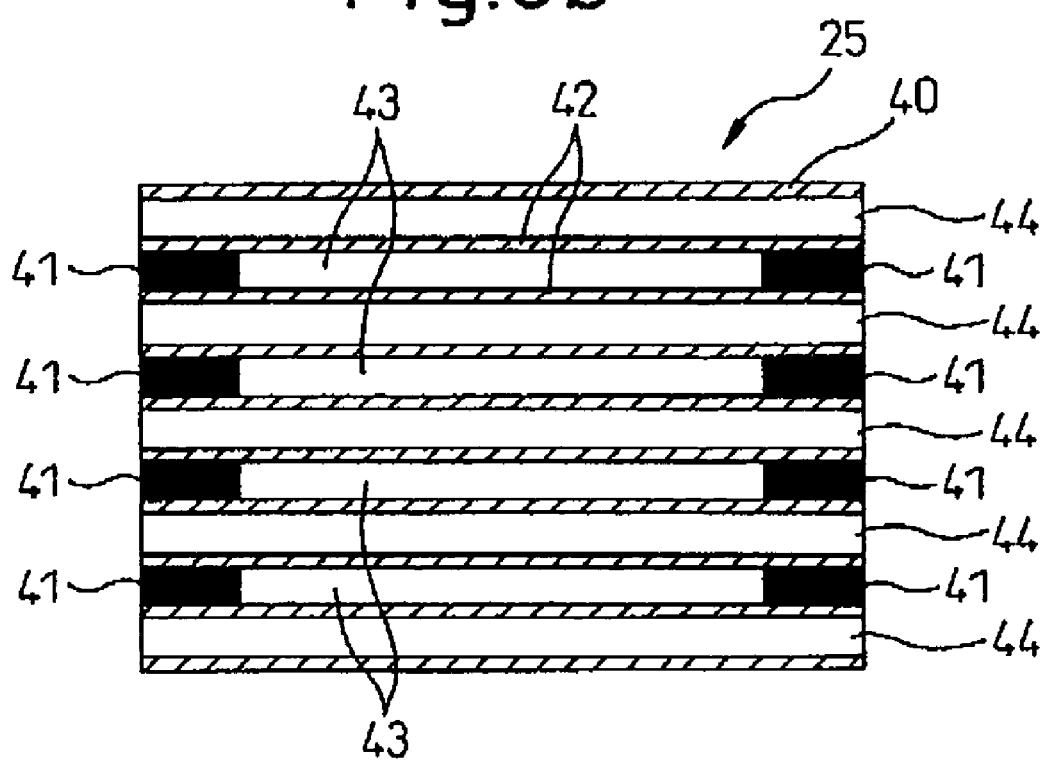
FIG. 5b is a longitudinal cross-sectional view of the same.

Next, a fourth embodiment will be explained. The S trap of the fourth embodiment is shown in FIGS. 5a and b. Here, FIG. 5a is a front view of an S trap of the fourth embodiment, while FIG. 5b is a longitudinal cross-sectional view of the same. The base material 40 of the S trap 25 of the present embodiment is the same as in the first embodiment. Further, in the present embodiment as well, the S trapping material 41 is arranged inside the cells 43 defined as "specific cells" in the first embodiment, but in the present embodiment, unlike the first embodiment, the S trapping material 41 is arranged at only the end regions at the two sides (regions at left ends and regions at right ends in view of FIG. 5b) in a manner packed so as to completely block the end regions.

In the fourth embodiment, the exhaust gas basically passes through the cells in which the S trapping material is not arranged, but at least part of the exhaust gas passes through the pores of the partitions 42, flows into the cells 43 where the S trapping material 41 is arranged, and flows through said cells 43 to reach the S trapping material 41, or passes through the pores of the partitions to reach the S trapping material 41 directly. Further, the SOx in the exhaust gas reaching the S trapping material 41 is trapped by the S trapping material. Of course, the SOx in the exhaust gas reaching the S trapping material 41 without passing through the partitions 42 from places directly exposed to the exhaust gas is also trapped by the S trapping material.

In the fourth embodiment as well, for the same reason as explained in relation to the third embodiment, the amount of SOx able to be trapped by the S trap as a whole is much greater compared with the past.

Figure 6:
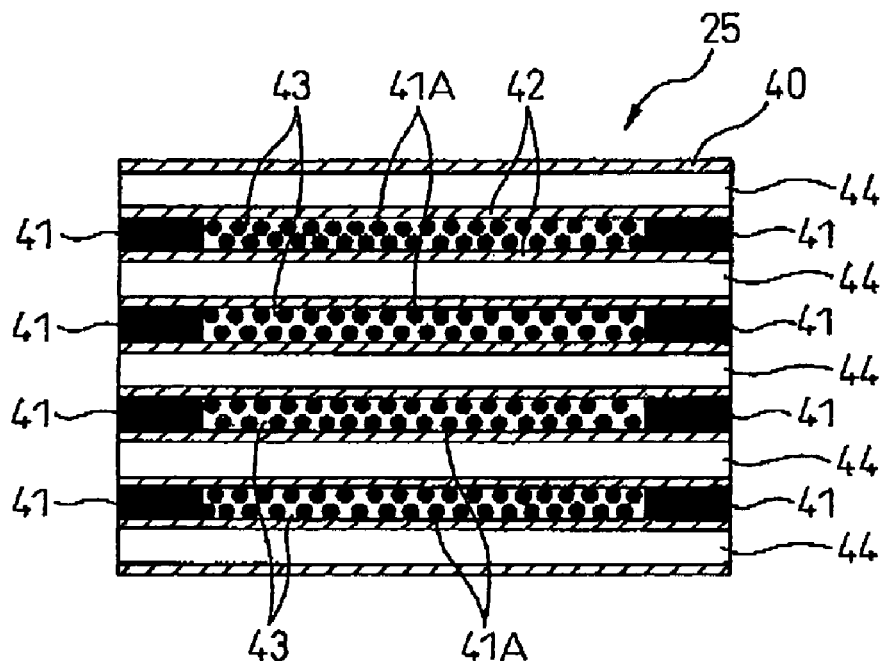
FIG. 6 is a longitudinal cross-sectional view of an S trap of still another embodiment of the present invention.

Note that in the fourth embodiment, nothing is arranged between the S trapping materials 41 arranged at the end regions of the two sides, but as shown in FIG. 6, it is also possible to arrange a large number of relatively small aggregates (for example, tablet shaped aggregates or pellet-shaped aggregates) 41A of the S trapping material between these S trapping materials 41 in a manner leaving spaces. According to this, the SOx in the exhaust gas flowing into the cells in which the S trapping materials 41, 41A are arranged can be reliably trapped.

Figure 7:
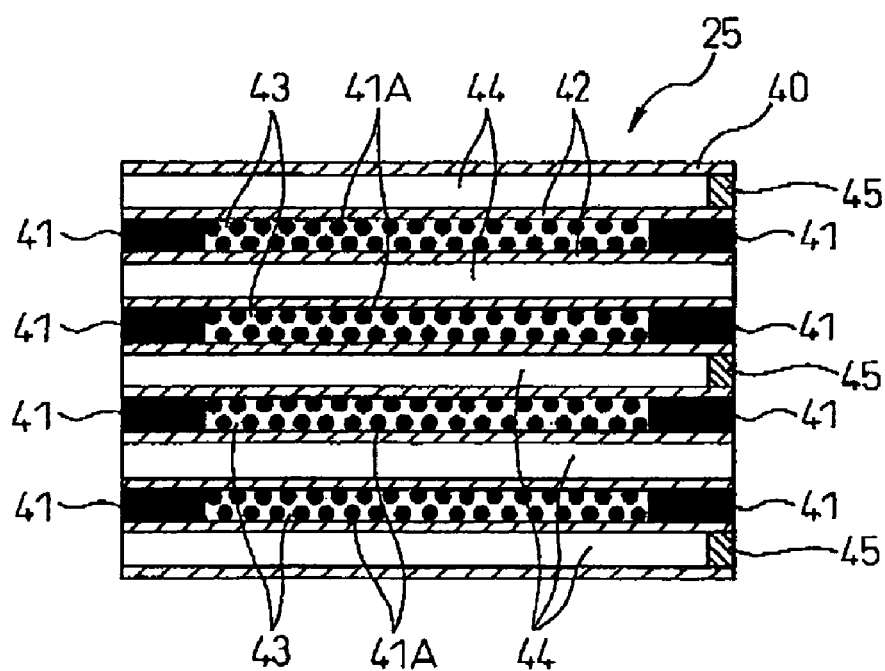
FIG. 7 is a longitudinal cross-sectional view of an S trap of still another embodiment of the present invention.

Further, in the example shown in FIG. 6, as shown in FIG. 7, it is also possible to block the openings at the downstream side (the right side in FIG. 7 when exhaust gas arrives from the left side in FIG. 7) of several cells among the cells 44 where the S trapping material is not arranged by plugs 45. According to this, the exhaust gas flowing into the cells 44 blocked by the plugs 45 has to pass through the cells 43 where the S trapping materials 41, 41A are arranged, so a greater amount of SOx can be trapped.

Figure 8:
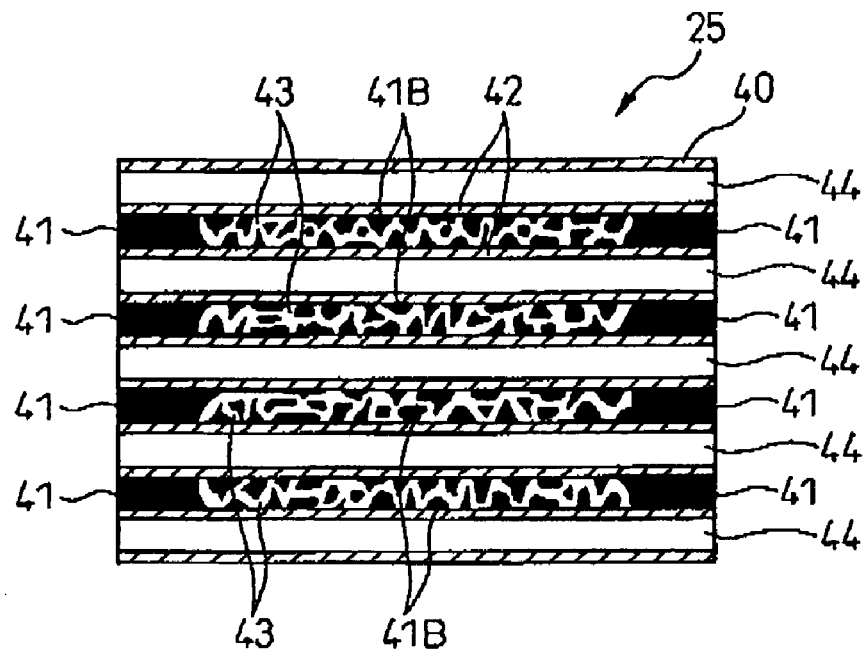
FIG. 8 is a longitudinal cross-sectional view of an S trap of still another embodiment of the present invention.

Further, as shown in FIG. 8, it is also possible to arrange porous S trapping material 41B packed between the S trapping materials 41 arranged at the end regions at the two sides. By this as well, it is possible to reliably trap the SOx in the exhaust gas flowing into the cells 43 where the S trapping materials 41, 41B are arranged.

Figure 9:
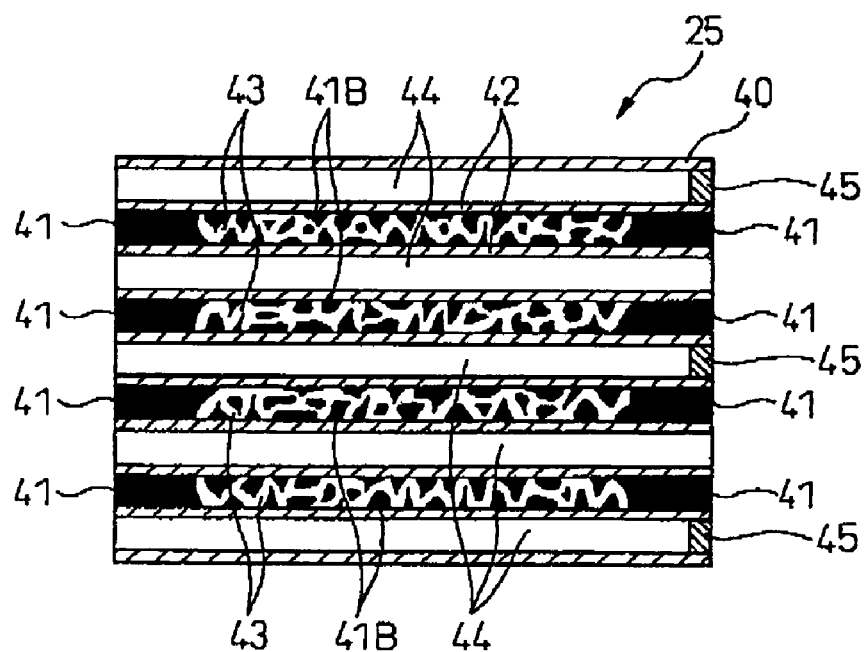
FIG. 9 is a longitudinal cross-sectional view of an S trap of still another embodiment of the present invention.

Further, in the example shown in FIG. 8 as well, as shown in FIG. 9, it is also possible to block the openings at the downstream side (the right side in FIG. 9 when exhaust gas arrives from the left side in FIG. 9) of several cells among the cells 44 where the S trapping material is not arranged by plugs 45. According to this, a greater amount of SOx can be trapped.

Note that in the above-mentioned embodiments, so long as not interfering with the exhaust gas passing through the partitions and arriving at the S trapping material, in the same way as the past, it is also possible thinly coat the S trapping material on the partition surfaces.

Figure 10:
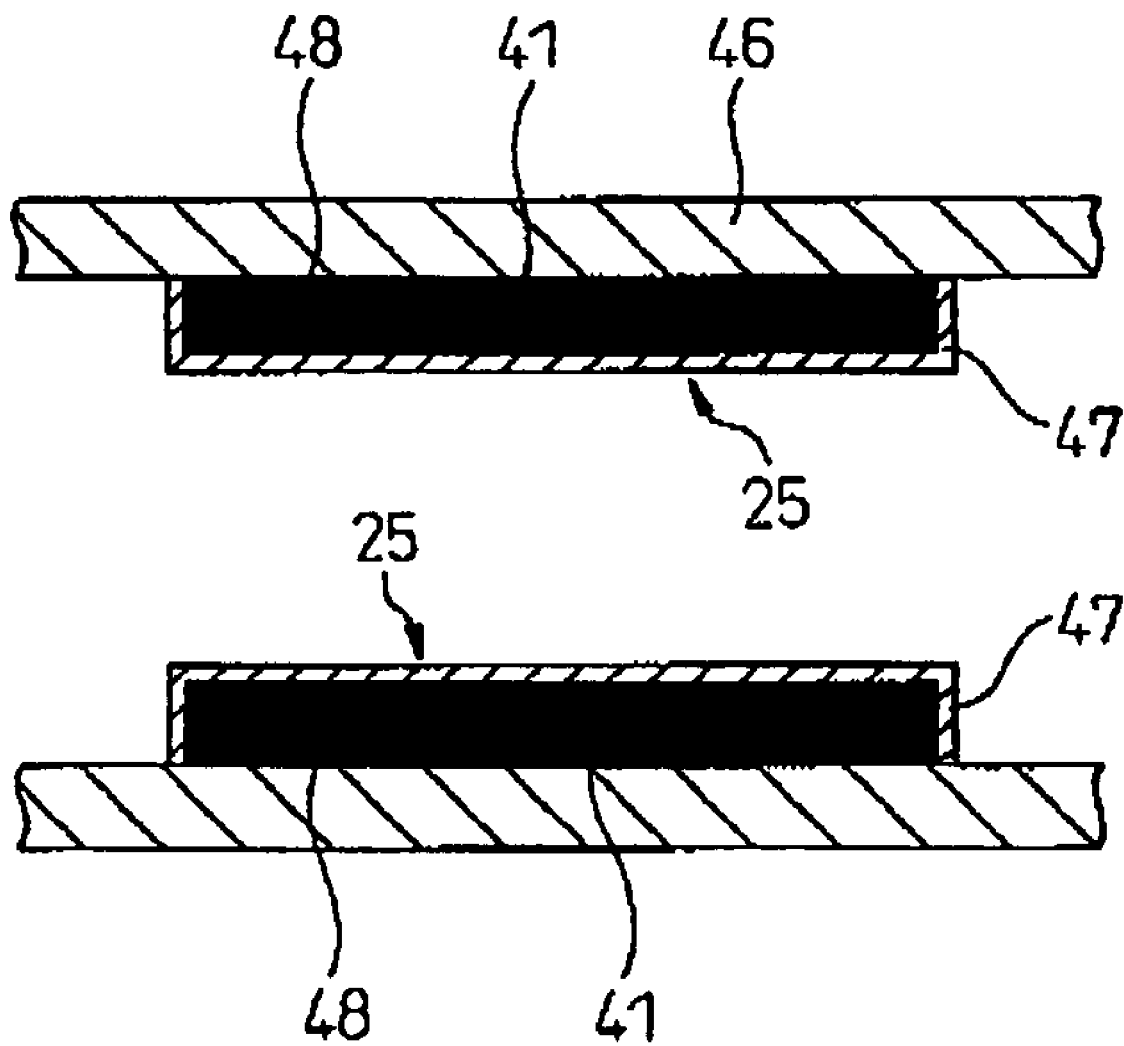
FIG. 10 is a cross-sectional view of an S trap of still another embodiment of the present invention.

Further, in the above explanation, the present invention was explained with reference to examples of embodiments where the S trapping materials 41, 41A, 41B were arranged inside the cells of the honeycomb-shaped base material 40, but as another embodiment, there is also the embodiment shown in FIG. 10. That is, in the embodiment shown in FIG. 10, spaces 48 separated by partitions comprised of a porous material 47 are formed in the exhaust pipe 46. In these spaces, aggregates 41 of the S trapping material are arranged packed. In this embodiment as well, rather than use thin S trapping materials 41, aggregates are used and there is a large quantity of S trapping material, so for the same reason as explained above, the amount of SOx which can be trapped by the S trap 25 as a whole becomes greater than in the past. From this viewpoint, the present invention, broadly speaking, can be said to be one which forms spaces separated by partitions comprised of a porous material inside a passage through which exhaust gas flows (exhaust pipe) and arranges aggregates of an S trapping material in said spaces.

However, as explained above, by arranging the S trapping material as aggregates inside the S trap, the amount of SOx which the S trap can trap as a whole can be remarkably increased. Along with this, there is the advantage that the following treatment can be applied to the S trap. That is, as explained above, the SOx trapped at the surface of the S trapping material diffuses inside the S trapping material, so the SOx trapping rate at the surface of the S trapping material basically should be maintained at a high value. However, along with the elapse of time, this SOx trapping rate sometimes rapidly falls. At this time, if raising the temperature of the S trap in the state where the air-fuel ratio of the exhaust gas flowing into the S trap is maintained lean, the SOx trapping rate is restored.

That is, in the state where the air-fuel ratio of the exhaust gas is maintained lean, if raising the temperature of the S trap, the SOs present concentrated near the surface of the S trapping material diffuses toward the inside of the S trapping material so that the concentration of SOx inside the S trapping material becomes uniform. That is, the sulfates produced inside the S trapping material change from an unstable state concentrated near the surface of the S trapping material to a stable state uniformly diffused throughout the inside of the S trapping material. According to this, the SOx concentration falls near the surface of the S trapping material and therefore the SOx trapping rate is restored.

Therefore, in the above-mentioned embodiments, when the SOx trapping rate has fallen (for example, when the SOx trapping rate has fallen below a predetermined rate), it is also possible to treat the S trap to raise the temperature of the S trapping material. According to this, the SOx trapping rate can be restored and the amount of SOx which the S trap can trap as a whole can be further improved. Further, in addition to treatment to raise the temperature in accordance with the SOx trapping rate of the S trap, the treatment to raise the temperature may also be performed when the amount of exhaust gas flowing into the S trap exceeds a certain fixed amount (it can be said that the greater the amount of this exhaust gas, the greater the amount of SOx trapped in the S trap).

Note that although the present invention was explained in detail based on specific embodiments, a person skilled in the art can be modified, changed, etc. in various ways without departing from the claims and concept of the present invention.

The invention claimed is:

1. An exhaust purification apparatus provided with a sulfur oxide trapping material for trapping sulfur oxides exhausted from an internal combustion engine, wherein aggregates of a sulfur oxide trapping material are arranged in a manner able to contact exhaust gas in spaces separated by partitions comprised of a porous material with permeability, means for performing sulfur oxide trapping rate restoration treatment are provided for raising the temperature of the aggregates of said sulfur oxide trapping material when an air-fuel ratio of circulating exhaust gas is lean to restore a trapping rate of sulfur oxides, and said aggregates of the sulfur oxide trapping material have thicknesses greater than thicknesses of surface parts where sulfur oxides are trapped in a case where said sulfur oxide trapping rate restoration treatment is not performed.

2. An exhaust purification apparatus as set forth in claim 1, wherein said aggregates of the sulfur oxide trapping material are arranged on said partitions.

3. An exhaust purification apparatus as set forth in claim 1, wherein said aggregates of the sulfur oxide trapping material are packed in said spaces.

4. An exhaust purification apparatus as set forth in claim 1, wherein said sulfur oxide trapping rate restoration treatment is performed in accordance with at least one of a ratio of sulfur oxides trapped by said sulfur oxide trapping material and an amount of exhaust gas flowing into said sulfur oxide trapping material.

5. An exhaust purification apparatus provided with a sulfur oxide trapping material for trapping sulfur oxides exhausted from an internal combustion engine, wherein the apparatus is provided with a base material having a plurality of passages defined by partitions comprised of a porous material, aggregates of the sulfur oxide trapping material are arranged in specific passages among the passages of said base material, means for performing sulfur oxide trapping rate restoration treatment are provided for raising the temperature of the aggregates of said sulfur oxide trapping material when an air-fuel ratio of circulating exhaust gas is lean to restore a trapping rate of sulfur oxides, and said aggregates of the sulfur oxide trapping material have thicknesses greater than thicknesses of surface parts where sulfur oxides are trapped in a case where said sulfur oxide trapping rate restoration treatment is not performed.

6. An exhaust purification apparatus as set forth in claim 5, wherein said aggregates of the sulfur oxide trapping material are arranged on partitions defining said specific passages.

7. An exhaust purification apparatus as set forth in claim 5, wherein said aggregates of the sulfur oxide trapping material are packed in said specific passages so as to at least partially block said specific passages.

8. An exhaust purification apparatus as set forth in claim 7, wherein said aggregates of the sulfur oxide trapping material are packed in the entire volumes of said specific passages.

9. An exhaust purification apparatus as set forth in claim 7, wherein at one passage of any two adjoining specific passages, said aggregate of the sulfur oxide trapping material is arranged at one end region of the passage and at the other passage, said aggregate of the sulfur oxide trapping material is arranged at the other end region of the other passage.

10. An exhaust purification apparatus as set forth in claim 7, wherein at one passage of any two adjoining specific passages, said aggregate of the sulfur oxide trapping material is packed at one end region of said passage so that the end region is blocked and at the other passage, said aggregate of the sulfur oxide trapping material is packed at the other end region of the other passage so that the other end region is blocked.

11. An exhaust purification apparatus as set forth in claim 7, wherein said aggregates of the sulfur oxide trapping material are arranged at both end regions of said specific passages.

12. An exhaust purification apparatus as set forth in claim 11, wherein porous aggregates of the sulfur oxide trapping material are arranged between the sulfur oxide trapping materials at the two end regions of the specific passages.

13. An exhaust purification apparatus as set forth in claim 12, wherein said porous aggregates of the sulfur oxide trapping material are arranged so as to occupy the entire volumes of the spaces between the sulfur oxide trapping materials at the two end regions of the specific passages.

14. An exhaust purification apparatus as set forth in claim 11, wherein a plurality of aggregates of the sulfur oxide trapping material are arranged, with spaces between them, between the sulfur oxide trapping materials at the two end regions of the specific passages.

15. An exhaust purification apparatus as set forth in claim 11, wherein aggregates of the sulfur oxide trapping material are arranged at downstream side end regions of passages other than said specific passages as well.

16. An exhaust purification apparatus as set forth in claim 11, wherein aggregates of the sulfur oxide trapping material are packed at downstream side end regions of passages other than said specific passages so as to block said end regions.

17. An exhaust purification apparatus as set forth in claim 7, wherein said aggregates of the sulfur oxide trapping material are packed at both end regions of said specific passages so as to block said end regions.

18. An exhaust purification apparatus as set forth in claim 5, wherein said sulfur oxide trapping rate restoration treatment is performed in accordance with at least one of a ratio of sulfur oxides trapped by said sulfur oxide trapping material and an amount of exhaust gas flowing into said sulfur oxide trapping material.

* * * * *